United States Patent
Wang et al.

(10) Patent No.: US 8,827,532 B2
(45) Date of Patent: Sep. 9, 2014

(54) LIGHT GUIDES

(75) Inventors: Qingbing Wang, Woodbury, MN (US);
Gary T. Boyd, Woodbury, MN (US); Tri D. Pham, Oakdale, MN (US); Robert Lee Erwin, Hudson, WI (US); David Scott Thompson, West Lakeland, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 167 days.

(21) Appl. No.: 13/450,970

(22) Filed: Apr. 19, 2012

(65) Prior Publication Data

US 2012/0268967 A1    Oct. 25, 2012

Related U.S. Application Data

(60) Provisional application No. 61/478,234, filed on Apr. 22, 2011.

(51) Int. Cl.
  *F21V 8/00*    (2006.01)
(52) U.S. Cl.
  USPC ............ 362/627; 362/625; 362/628; 362/629
(58) Field of Classification Search
  CPC .......................... G02B 6/0053; G02B 27/2264
  USPC ................................................. 362/627–629
  See application file for complete search history.

(56) References Cited

U.S. PATENT DOCUMENTS

| 2008/0050560 A1* | 2/2008 | Jones et al. .................... | 428/148 |
| 2009/0142020 A1* | 6/2009 | Van Ostrand et al. .......... | 385/31 |
| 2009/0154198 A1* | 6/2009 | Lee et al. ....................... | 362/624 |
| 2010/0178470 A1* | 7/2010 | Jones et al. .................... | 428/172 |
| 2010/0245717 A1* | 9/2010 | Miyamoto et al. .............. | 349/65 |
| 2011/0187764 A1* | 8/2011 | Bae et al. ....................... | 345/697 |
| 2013/0146332 A1* | 6/2013 | Ramakrishnan et al. ..... | 174/250 |

OTHER PUBLICATIONS

Pocius, A., "Adhesion and Adhesive Technology, An Introduction", $2^{nd}$ edition, Hanser Gardner Publications, 2002, 8 pages, Oct. 12, 2010.
U.S. Appl. No. 61/323,941, filed Apr. 14, 2010.

* cited by examiner

*Primary Examiner* — Elmito Breval
(74) *Attorney, Agent, or Firm* — Daniel J. Iden

(57) ABSTRACT

Lightguides are disclosed. More particularly, lightguides that include a lightguiding layer and a light extracting layer having a structured surface are disclosed. The light guiding layer is optically coupled to a first set of structures of the structured surface at given locations, and is not optically coupled to a second set of structures at given locations, thereby producing total internal reflection at the second locations. The selective optical coupling may be achieved by a number of different contemplated means as discussed herein. The lightguides allow for distribution of light along with redirection towards an image viewer without a number of commonly required optical elements in backlights.

11 Claims, 8 Drawing Sheets

LIGHT GUIDES

CROSS-REFERENCE TO RELATED APPLICATION

This application claims priority to U.S. Provisional Patent Application No. 61/478,234, filed on Apr. 22, 2011, the disclosure of which is incorporated by reference herein in its entirety.

FIELD

The present description relates to lightguides. More particularly, the present description relates to lightguides that include a lightguiding layer and a light extracting layer with a structured surface, where the light guiding layer is optically coupled to certain structures on the structured surface at given locations, and is not optically coupled to other structures at second locations, thereby producing total internal reflection at the second locations and extraction at the first locations.

BACKGROUND

Display systems, such as liquid crystal display (LCD) systems, are used in a variety of applications and commercially available devices such as, for example, computer monitors, personal digital assistants (PDAs), mobile phones, miniature music players, and thin LCD televisions. Most LCDs include a liquid crystal panel and an extended area light source, often referred to as a backlight, for illuminating the liquid crystal panel. Backlights typically include one or more lamps or LEDS and may contain all or some of the following optical components: a reflector, a lightguide plate, bottom diffusers, crossed prism films, reflective polarizers, diffuser cover sheets and absorptive polarizers. The use of such a high volume of backlight components adds to both the necessary size and cost of backlight units. It would therefore be beneficial to provide a backlight that was capable of achieving high-level performance without the necessity of at least some of the components mentioned above.

SUMMARY

In one aspect, the present description relates to a lightguide. The lightguide includes a lightguiding layer that has a first major surface, an opposing second major surface, and a side surface. The lightguide also includes a structured surface facing the first major surface of the lightguiding layer. The lightguiding layer receives light from the side surface, where the received light propagates within the lightguiding layer by total internal reflection from at least the first major surface. The structured surface is made up in part of a first plurality of optical structures, where each first optical structure extracts light from the lightguiding layer by frustrating total internal reflection at the first major surface of the lightguiding layer. The structured surface is further made up in part of a second plurality of second optical structures, each second optical structure not frustrating total internal reflection at the first major surface of the lightguiding layer. In at least some embodiments, the first optical structures frustrate total internal reflection at the first major surface by being optically coupled to the lightguiding layer by an optical coupling layer, and the second optical structures do not frustrate total internal reflection at the first major surface by not being optically coupled to the lightguiding layer by the optical coupling layer. In other embodiments, the first and second optical structures may be at different distances from the first major surface, such as where the first and second optical structures have different heights.

In another aspect, the present description relates to a lightguide. The lightguide includes a lightguiding layer, a light extracting layer, and an optical coupling layer. The lightguiding layer is made up in part of a first major surface, an opposing second major surface, and a side surface, where the lightguiding layer receives light from the side surface. The received light propagates within the lightguiding layer by total internal reflection from at least the first major surface. The light extracting layer of the lightguide includes a structured major surface facing the first major surface of the lightguiding layer. The structured major surface includes a first plurality of first optical structures that extract light from the lightguiding layer and a second plurality of second optical structures that do not extract light from the lightguiding layer. The optical coupling layer of the lightguide adheres each first optical structure, but no second optical structure, to the first major surface of the lightguiding layer.

In a third aspect, the present description relates to another lightguide. The lightguide includes a lightguiding layer and a structured surface. The lightguiding layer has a first major surface, an opposing second major surface, and a side surface. The lightguiding layer receives light from the side surface, where the received light propagates within the lightguiding layer by total internal reflection from at least the first major surface. The structured surface of the lightguide faces the first major surface of the lightguiding layer. The structured surface is made up in part of a plurality of first linear optical structures, where each first linear optical structure extracts light from the lightguiding layer at a plurality of first locations, but not second locations, along the length of the optical structure by frustrating total internal reflection at the first locations on the first major surface of the lightguiding layer. In some cases, there may be second linear optical structures that do not extract light at any location along the length of the second optical structures.

DETAILED DESCRIPTION

Generally, backlights utilized for display systems, such as LCD systems, contain a wide array of different elements that are used in combination with one another. These components may include lighting components, such as lamps or LEDs, and other optical components such as a reflector, a lightguide plate, bottom diffusers, crossed prism films, reflective polarizers, diffuser cover sheets and absorptive polarizers. The combination of all of these components serves to provide a system that is more efficient, with higher brightness and contrast, as well as having desired light directionality and distribution across the viewing surface. Unfortunately, including each of the components mentioned adds both cost to an LCD system and volume to the backlight. It would therefore be desirable to have a backlight that could achieve the same performance of the backlights discussed above, while removing at least some of the components, thereby reducing cost and device size. Reducing the number of components, especially free-floating components may result in less potential failure interfaces in the backlight, such as trapped dust, or damage defects to mechanical rubbing against a prism film. In addition, it may be desirable to have a backlight with a standard light that could effectively extract light without machining extraction features directly onto or into the lightguide.

The present description provides for such a backlight. In particular, the present description utilizes an optical film with surface features that are optically coupled to a light-guiding medium to extract light from that medium, and also redirect it towards normal to the film plane (and LC panel), preferably without the use of additional prismatic films. The present description also allows for a standard lightguide that may effectively extract light from a light source and guide without the need for machining features directly onto or into the light guide. Additional components such as a diffuser, reflective polarizer, and an absorptive polarizer may be attached to or integrated onto the extractor film to create a unitary light management system, reducing the number of components in the backlight. In addition, thinner subcomponents may be used, which as independent films would warp or curl due to changes in environmental conditions. The backlight system may also be attached directly to the rear absorptive polarizer of an LCD panel, forming an entirely unitary display with an extremely thin form factor.

The optical film of the present invention is optically coupled to the light-guiding film in a non-contiguous manner, a property that is important in achieving the desired lightguiding, balance, and redirection of source light for the display. This non-contiguous coupling may be achieved in a number of different manners, as is described in the embodiments described hereafter.

Figure 1:
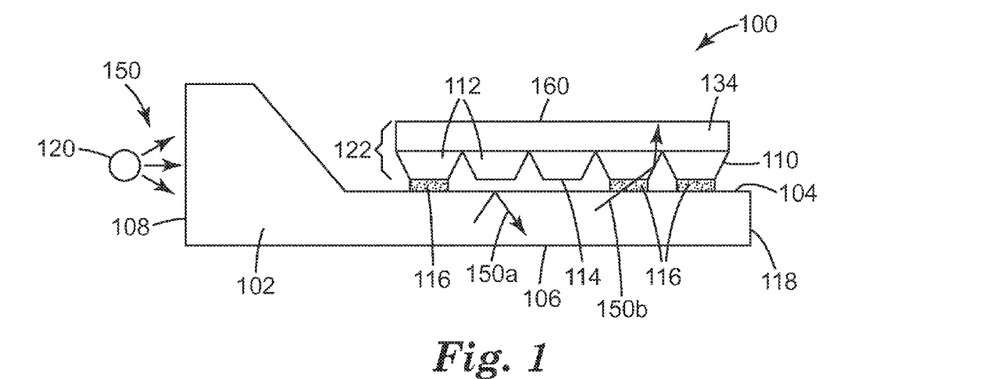
FIG. 1 is a cross-sectional view of a lightguide according to the present description.

A first embodiment of the present description is illustrated by lightguide 100 of FIG. 1. The lightguide 100 is made up in part of a lightguiding layer 102. The lightguiding layer 102 includes a plurality of surfaces. The lightguiding layer has at least a first major surface 104 and a second major surface 106 that opposes first major surface 104. As such, surface 106 may be understood as an opposing second major surface. The lightguiding layer 102 further includes a side surface 108. Side surface 108 is the location from which light 150 is received from light source 120 and enters the lightguiding layer to travel through the lightguide. The light source 120 for injecting light into the lightguiding layer 102 may include any number of conventional backlighting light sources commonly used in the art, and further may include either one or a plurality of light sources. In some embodiments, for example, the light source 120 or light sources may be LED(s) or cold cathode fluorescent lamp(s) (CCFL(s)). Lightguiding layer may generally be made up of a solid transparent material, such as glass or a clear polymer. In at least some embodiments, the lightguiding layer 102 may be formed by injection molding, form plating, or may simply be a base lightguide film.

In at least some embodiments, such as that shown in FIG. 1, the lightguiding layer 102 may be thicker near side surface 108 than at the opposing distal surface 118 of the lightguiding layer, such that the lightguiding layer tapers to a nominal thickness near the distal surface 118. Generally, the lightguides illustrated in the figures of this description provide for a tapered lightguiding layer, although this need not be the case. This tapering to a less wide distal surface 118 allows for a thinner backlight, which is highly desirable in flat-screen applications. Once received light 150 enters the lightguiding layer 102, it propagates within the lightguiding layer 102 by total internal reflection from at least the first major surface 104, as illustrated by light ray 150a of FIG. 1. In a number of prior art backlighting applications, a lightguiding layer such as that shown in FIG. 1 will include a plurality of features on one or both of first major surface 104 and second major surface 106. These features generally allow for extraction of light by refraction, diffraction, diffusion or reflection of light injected into the layer. In light of the presence of these features in conventional lightguiding layers, light generally exits what would be equivalent to the first major surface 104 at very high angles to the surface normal. Due to the high degree of off-axis light, such lightguiding layers require redirection towards the normal using additional prism films and/or diffusers, for the purpose of backlighting LCD panels. The present description, as described above and as illustrated in FIG. 1, eliminates the need for these further elements by extracting light in a different manner than that conventionally shown in the prior art. Absent extraction features on the first and/or second major surfaces, a great deal of light 150 that travels through the lightguiding layer 102 will be totally internally reflected, as illustrated by ray 150a. Non-contiguous optical coupling of an extractor film along the first major surface allows for controlled positions and amounts of total internal reflection as well as directionality of output light. This benefit is even more important when considering the fact that a separate light extracting layer may be created to effectively extract light from a lightguiding layer that is entirely planar on a first major surface 104. This may allow for a standard flat lightguiding layer that can be effectively extracted from, without the necessity of machining or etching extraction features directly onto or into the lightguiding layer. A further description of one embodiment of the present description is discussed below, also with respect to FIG. 1.

The lightguide 100 includes a structured surface 110 that faces the first major surface 104 of the lightguide. The structured surface 110 may be understood as one surface of a larger light extracting layer 122. Light extracting layer also has a top surface 160 opposite the structured surface. The structured surface 110 is made up of two distinct sets of optical structures. The first major surface 110 includes a first plurality of first optical structures 112. Each of the first optical structures 112 extracts light 150b from the lightguiding layer. This extraction is achieved by frustrating total internal reflection at the first major surface 104 of the lightguiding layer. The first major surface also includes a second plurality of second optical structures 114. Each of the second optical structures 114 does not frustrate total internal reflection at the first major surface 104 of the lightguiding layer. For purposes of this application, and as one of skill in the art would understand it, where total internal reflection is frustrated, the extraction efficiency at that given surface location of the lightguide will be close to 100%, i.e. at least over 95%, and likely over 99% or potentially over 99.9%, and even over 99.99%. Where total internal reflection occurs, the extraction efficiency at that surface location is close to 0%, i.e. less than 5%, and potentially less than 1% and even less than 0.1% and 0.01%. It should be understood throughout this description that although not always explicitly mentioned, first optical structures 112 (or e.g., 412, 512, 712, etc.) throughout this specification as well as second optical structures 114 (or e.g., 414, 514, 714, etc.) are part of a greater structure known as the light extracting layer 122. This light extracting layer may generally be made up of both first and second optical structures as well as a substrate or land portion 134 that supports the structures and may offer other functionality. Furthermore, there may be other and/or additional mechanisms for extracting light.

Light extracting layers or films with first optical structures 112 and second optical structures 114 may be made by any number of methods known by those skilled in the art. These can include, e.g. fabricating a tool using engraving, embossing, laser ablation or lithographic methods, then employing the tool to create the structured film/layer via cast-and-cure or extrusion replication techniques.

Figure 2:
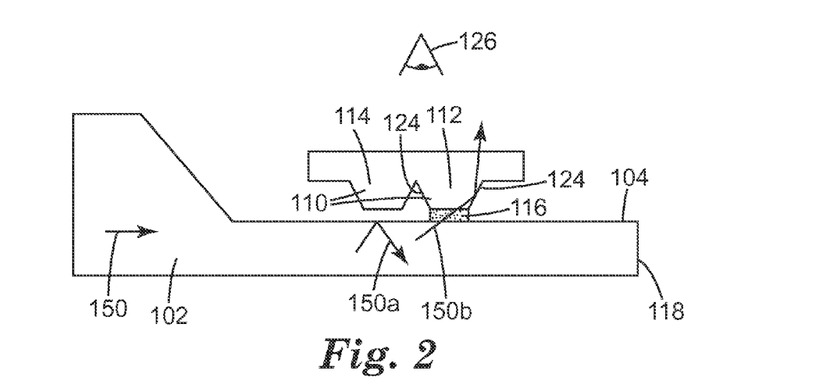
FIG. 2 is a close-up cross-sectional view of a portion of a lightguide.

A better understanding of the function of first optical structures 112 as well as adhesive 116 in the current embodiment is illustrated in FIG. 2. Light 150 travels through lightguiding layer 102 and at second optical structure 114 no coupling is present between first major surface 104 and structured surface 110. Thus light 150 is totally internally reflected at this point along the lightguiding layer 102. However, at first major structure 112, a coupling region is present due to the adhesive layer 116 placed between first major surface 104 and structured surface 110. As such light 150b is not totally internally reflected and is extracted from first major surface into first structure 112. The shape and angle of the structures amongst the first structures 112 is important to the function of the device. Light 150b is not only extracted by first structure 112 but also is incident upon facet 124 of first structure 124. Upon reflection from facet 124, light 150b is redirected at normal to first major surface 104 towards an image panel and viewer 126. In some embodiments, light 150b may be reflected multiple times off of facets 124 before being directed towards a viewer 126. It should be understood that the number and distribution of first optical structures 112 that are placed to extract light is very important in creating the desired light uniformity and brightness of the backlight. This allows for the potential exclusion of, e.g., additional prismatic films, such as brightness enhancing films.

Although FIG. 1 illustrates non-contiguous coupling of first major surface 104 and structured surface 110 of light extracting layer 122 by selectively patterned adhesive 116, the first optical structures 112 may frustrate total internal reflection at the first major surface 104 by optically coupling to the first major surface in a plurality of other manners. A number of different contemplated manners of non-contiguously coupling a lightguiding layer 102 to a separate structured surface are shown in the figures and embodiments that follow.

Figure 3:
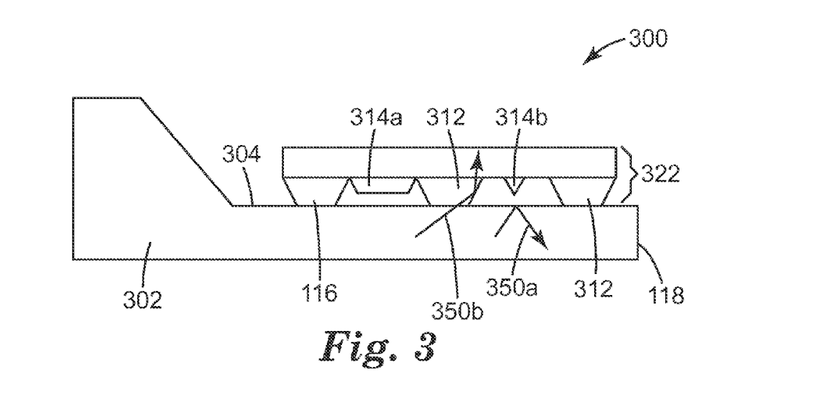
FIG. 3 is a cross-sectional view of a lightguide according to the present description.

For example, the lightguide 300 of FIG. 3 provides a lightguiding layer 302 that is similar to that illustrated in FIGS. 1 and 2. The lightguide also is made up in part of a light extracting layer 322 that has a structured surface 310. Again, a set of first optical structures 312 frustrates total internal reflection at first major surface 304 allowing optical coupling of light 350b. In this embodiment, the first optical structures 312 frustrate total internal reflection at the first major surface by being sufficiently close to the first major surface 304. In a number of embodiments, this may mean that the first optical structures 312 are in direct contact with first major surface 304. However, in other embodiments, the first optical structures 312 may simply be in close enough proximity to first major surface 304 to allow for other manners of optical coupling, e.g., evanescent coupling. The second optical structures 314a and 314b do not frustrate total internal reflection at the first major surface 304 by being sufficiently far from the first major surface 304. Thus light 350a in lightguiding layer that is incident on first major surface 304 in close proximity to second major structures is totally internally reflected.

As will be discussed further below, in many embodiments, an optical coupling layer may serve to couple the lightguiding layer and light extracting layer of the presently described lightguides. However, where no such layer is used, first optical structures (e.g. 312) that are in close proximity to first major surface 304 may be more effectively optically coupled to first major surface by ultrasonic welding the first optical structures 312 to surface 304 of lightguiding layer 302. Ultrasonic welding is a unique process whereby two pieces of material are joined together seamlessly by a solid-state weld through high-frequency acoustic vibrations. Acoustic energy that is incident upon the two components is converted into heat energy by friction, and the parts are welded together nearly instantly, without any sort of adhesive or soldering material and without any coupling layer between them at all.

As shown in FIG. 1, the first optical structures may be in contact with first major surface by means of a an intermediary layer, such as adhesive layer 116 that couples first optical structures 112 to first major surface 104 but not second optical structures 114. However, in the embodiment in FIG. 3, the first optical structures 312 are in close proximity to the first major surface 304 because each of the first optical structures 312 is taller than each second optical structure (314a and 314b). In some cases, this may be because the second optical structure is machined to a lower level than the first optical structures 312. An example of one such second optical structure is element 314a. In other embodiments, however, the second optical structure may, without any grinding, lapping or other form of machining, be originally formed at a lower height that first optical structures. An example of one such structure is illustrated as element 314b.

Figure 18A:
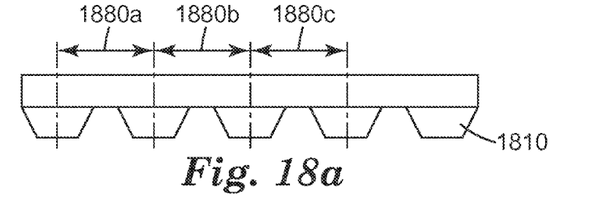
FIGS. 18a-d are cross-sectional views of extractor layers according to the present description.
Figure 18B:
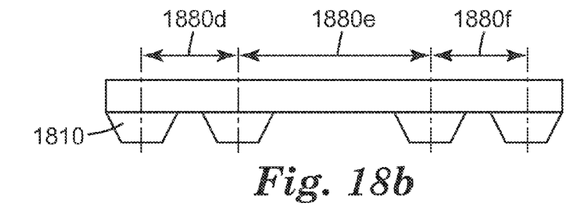
Figure 18C:
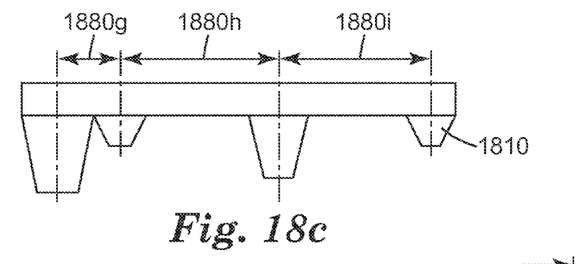
Figure 18D:
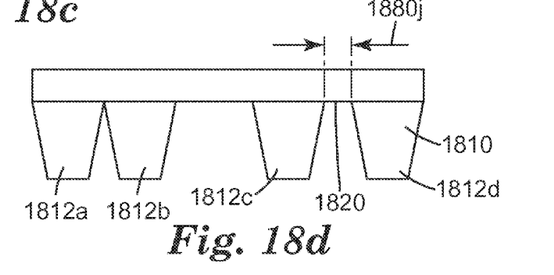

Throughout this description, it should be understood that the first and/or second optical structures on the structured surface of light extracting layer may be periodically spaced in a constant spacing manner, or may be spaced at completely different intervals. In addition the sizes of the structures on the layer may vary completely. FIG. 18a illustrates an embodiment in which the structures of structured surface 1810 are spaced at a constant spatial relation. This means that distances 1880a, 1880b and 1880c are equal to one another. In this embodiment, the structures are also the same size. However, the FIG. 18b embodiment is also contemplated where although certain structures are spaced at a common interval (e.g. distance 1880d, and 1880f) there may be a great space between two structures 1880*e*. Of course, as illustrated in FIG. 18*c*, varying spatial distances 1880*g*, 1880*h*, and 1880*i* are also contemplated, along with varying structure sizes on surface 1810. Further, looking to FIG. 18*d*, adjacent microstructures (see 1812*a* and 1812*b*) may have bases that are directly adjacent and abutting one another. In other embodiment, the adjacent microstructures (1812*c* and 1812*d*) generally have a space between them 1880*j* on surface 1820.

Figure 4:
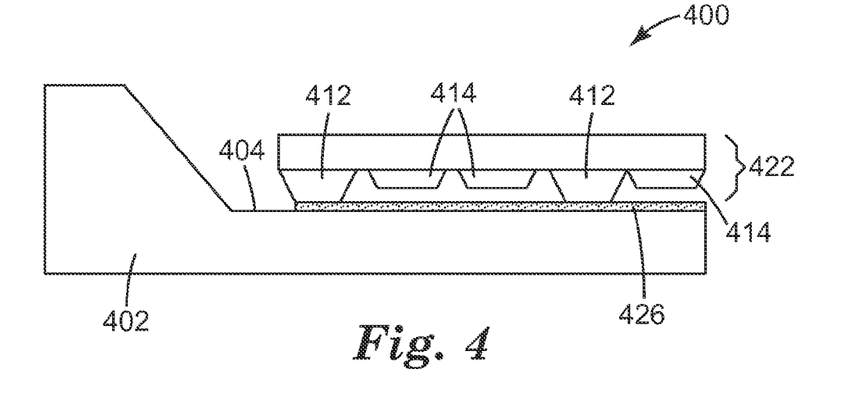
FIG. 4 is a cross-sectional view of a lightguide according to the present description.

Looking to FIG. 4, in at least some embodiments, the lightguide 400 may include an optical coupling layer 426. The optical coupling layer 426 may be disposed directly on first major surface 404 of lightguiding layer 402. In this embodiment, each first optical structure 412 frustrates total internal reflection at first major surface 404 by being optically coupled to the lightguiding layer 402 by optical coupling layer 426. Each second optical structure 414 does not frustrate total internal reflection at the first major surface 404 by not being optically coupled to the lightguiding layer by the optical coupling layer 426. As discussed with the embodiment shown in FIG. 3, and with all embodiments described herein, optical coupling between the first optical structures 412 and optical coupling layer 426 (and by extension first major surface 404) may be achieved by close proximity without bonding, and potentially by evanescent coupling. However, in many embodiments, the optical coupling layer 426 adheres the first optical structures 412 to the first major surface 404, and does not adhere second optical structures 414 to the first major surface 404. This is how the coupling and lack of coupling is achieved in those embodiments. Thus, optical coupling layer 426 may be an appropriate adhesive. In at least some embodiments, the optical coupling layer may be a pressure sensitive adhesive, such as 3M pressure-sensitive adhesive SP-7555, L4002 pressure sensitive adhesive by KIWO, Inc (Seabrook, Tex.), or the layer may be an adhesive cured by dry process, e.g., a UV curable adhesive, such as optical adhesive NOA65 from Norland Products, Inc. (Cranbury, N.J.). For further general description of potentially appropriate adhesives for optical coupling layer 426, see A. Pocius, *Adhesion and Adhesive Technology, An Introduction*, 2nd Ed., Hanser Gardner Publications, 2002, ISBN-1-56990-319-0.

Returning to FIG. 1, the adhesive portions 116 that couple the first optical structures 112 to first major surface 104 may also be understood as an optical coupling layer. In another manner, an optical coupling layer 116 may be understood as covering the first major surface 104 in each area corresponding to a first optical structure 112, and not covering the first major surface 104 in each area corresponding to a second optical structure 114. In either case, these elements 116 would be understood as a common discontinuous optical coupling layer. Although described as an adhesive in FIG. 1, a discontinuous optical coupling layer, as illustrated by elements 116 may be another appropriate material that does not act as an adhesive. Of course where a discontinuous optical coupling layer does act to adhere first optical structures 112 to first major surfaced 104 and does not adhere second optical structures 114 to first major surface 104, the layer may be any appropriate adhesive, as with layer 426. In some embodiments, adhesive 116 may be a pressure sensitive adhesive. Other appropriate adhesive to use for layer 426 (and all other optical coupling layers described herein) may include two part adhesives, or resin that is post-cured by ultraviolet light or by a thermal process. In other potential embodiments, the optical coupling layer may be reflective at certain at certain points along the length of the light extracting layer and transmissive at other points to further aid in determining where light may be coupled from the lightguiding layer to the light extracting layer.

Figure 6:
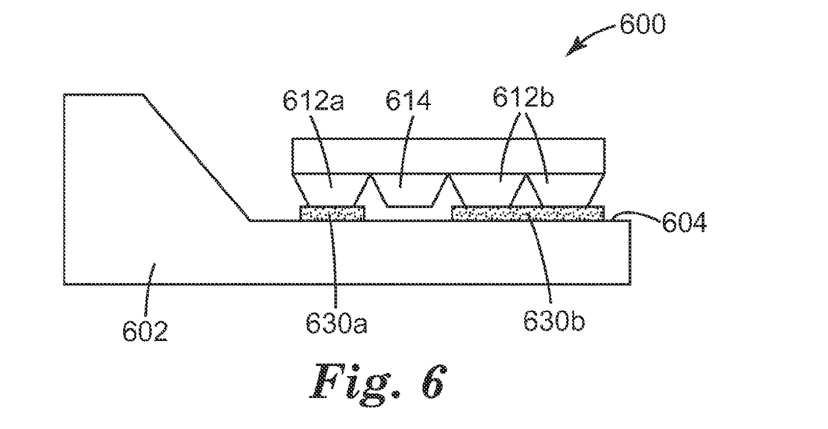
FIG. 6 is a cross-sectional view of a lightguide according to the present description.

In addition, although FIGS. 1 and 2 illustrate a discontinuous optical coupling layer of optical elements 116, where each first optical structure has its own corresponding discrete coupling component, this need not be the case. For example, looking to FIG. 6 and lightguide 600, a discontinuous layer 630*a* and 630*b* may be split into separate portions, where at least one of the portions (630*b*) optically couples multiple first optical structures 612*b* to first major surface 604 of lightguiding layer 602. As with the embodiment in FIG. 1, there may be portions of discontinuous optical coupling layer 630*a* that couple only one first optical structure to first major surface 604. Where discontinuous layers 630*a* and 630*b* do not cover first major surface 604, second optical structures 614 are not coupled to the surface and total internal reflection within lightguiding layer 602 occurs. Although multiple adjacent first optical structures 612*b* are coupled to first major surface 604, the layers 630*a* and 630*b* may generally still be understood as discontinuous because there are portions of major surface 604 between the farthest reaches of layer 630*a* and 630*b*, where no layer is present.

Figure 5:
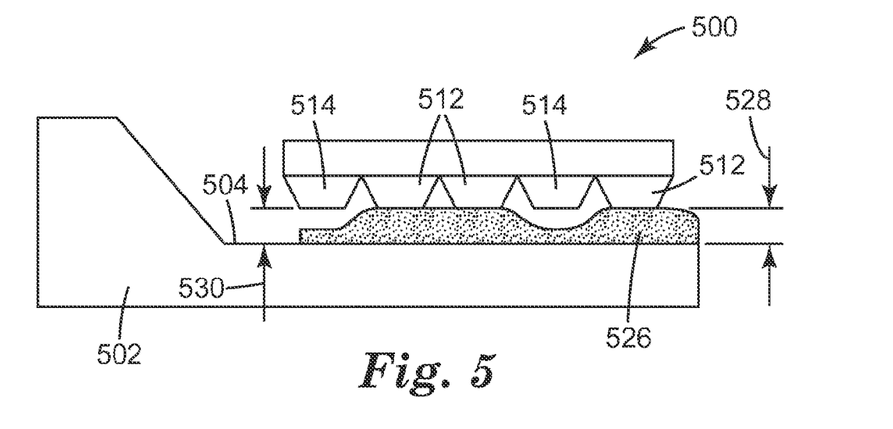
FIG. 5 is a cross-sectional view of a lightguide according to the present description.

In another embodiment, as shown in FIG. 5, there may be a continuous optical coupling layer 526 that optically couples first optical structures 512 and not second optical structures 514 to the first major surface 504 of lightguiding layer 502. However, in this embodiment the optical coupling layer 526 has a thickness 528 in each area corresponding to a first optical structure 512 and a thickness 530 at each area corresponding to a second optical structure. The thickness 528 at areas of first optical structures is greater than the thickness 530 at positions of second optical structures. Thickness 530 may vary at different second optical structures 514 so long as it is less than thickness 528 and thin enough to frustrate total internal reflection at first major surface 504.

Figure 7:
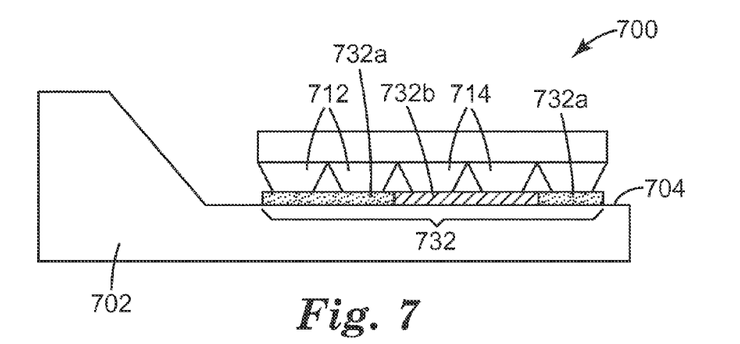
FIG. 7 is a cross-sectional view of a lightguide according to the present description.

Another embodiment of a lightguide 700 according to the present description is illustrated in FIG. 7. In this embodiment a continuous, or even potentially discontinuous optical coupling layer 732 is applied to the first major surface 704 of lightguiding layer 702. However even where the layer 732 is continuous, as shown in FIG. 7, portions of the layer (732*a*) provide for optical coupling between first optical structures 712 and other portions of the layer (732*b*) frustrate optical coupling between second optical structures 714 by creating total internal reflection. This selective optical coupling of a common layer may be caused by provided a higher index of refraction in those layer portions 732*a* that correspond to a first optical structure 712, and a lower index of refraction in those layer portions 732*b* that correspond to a second optical structure 714. For example the index of refraction of layer portions 732*a* may be greater than 1.3, or greater than 1.4 or greater than 1.5. The index of refraction of layer portions 732*b* may be less than 1.3, or less than 1.25, or potentially less than 1.2. In some cases, the layer 732 may initially be made up of a constant or near constant index of refraction. The index may be altered in either region 732*a* or 732*b* by patterning the layer. One method of patterning the index is to use a patterned photo-cure process on materials whose refractive index is sensitive to the dosage of the cured light. An example of such a material is a photo-refractive polymer used in making volume holograms, and ultra low index materials whose index can be locally reduced when exposed to light curing radiation. Examples of such materials may be found in commonly owned and assigned U.S. Provisional Application No. 61/323,941, directed towards a Patterned Gradient Polymer Film and Method. Such patterned index materials may be attached between adhesive layers to improve optical coupling to the lightguiding layer or light extracting layer. Another method is to pattern low index materials on to the lightguiding layer or light extracting layer, followed by an overcoat of higher index adhesive material to bond the lightguiding layer and light extracting layer (and corresponding first optical structures).

In other embodiments, the optical coupling layer 732 may be of uniform, or near uniform thickness, but the adhesive properties of the layer are changed in those portions 732b to make them less adhesive. A low adhesion area can be created by a patterning a low adhesion coating on layer 732 by lithographic or laser ablation methods. Areas of grater adhesion (e.g. portion 732a) can result from UV flash exposure through an appropriate mask or focused beam to form locally amorphous regions (e.g. 732a) on the surface that differ in surface energy and preferentially bond in these regions.

In any of the cases described above where an optical coupling layer (e.g. 116, 526, 526, 630a-b, 732 and those described hereafter) is an adhesive of some sort, it may be applied in any number of appropriate manners. For example, adhesives may be applied by direct placement, such as inkjet printing or screen printing. In some embodiments, the adhesives may be patterned onto the lightguiding layer or onto the light extracting layer's optical structures or onto a transfer film by Laser Induced Thermal transfer. This process includes providing a thermal transfer layer adjacent to an adhesive layer, and placing the adhesive layer proximate a recipient surface. A laser is then focused onto a desired region to activate the thermal transfer material to deposit the adhesive onto the recipient surface. Adhesives may also be applied by a transfer process where the patterned adhesive is first formed on a substrate with a suitable release coating, such that after contact with the lightguiding layer or light extracting layer, or after an ultraviolet or thermal cure process, and removal of the substrate, the adhesive portion remains predominantly on the desired surface. The adhesive material may be patterned on the substrate by inkjet or screen printing, photo-lithography, or by patterned gravure or offset printing methods.

In at least some embodiments, the structures (e.g. 112 and 114) of an extracting layer may be formed by various replication means from tool, using UV curing, embossing, or extrusion methods, so long as the final article is capable of transmitting light. Like the lightguiding layer, the light extracting layer may generally be optically clear—and thus is made of an optically clear material such as glass or a clear polymer. However, the layer may also be made appropriately diffuse by using particle additives or polymer phase separation.

To this point, the lightguides in question have generally been discussed from a cross-sectional perspective, or potentially in a "two-dimensional" sense. It is useful to further understand the embodiments of lightguides in the current description in three dimensions. A perspective view of one lightguide according to the present description is provided in FIG. 9. Lightguide 900 is made up in part of a lightguiding layer 902 and a structured surface 910. The lightguiding layer has a first major surface 904 and a second major surface 906 that is located opposite the first major surface. The lightguiding layer 902 further has a side surface 908. Input light 950 is received at side surface 908 and propagates within the lightguiding layer by total internal reflection from at least the first major surface 904. Ray 950a illustrates total internal reflection at a given point on the first major surface. The structured surface 910 is the surface of a greater extracting layer 922. Light extracting layer 922 also has a top surface 960 opposite the structured surface 910. The structured surface 910 faces the first major surface 904 of the lightguiding layer.

Figure 9:
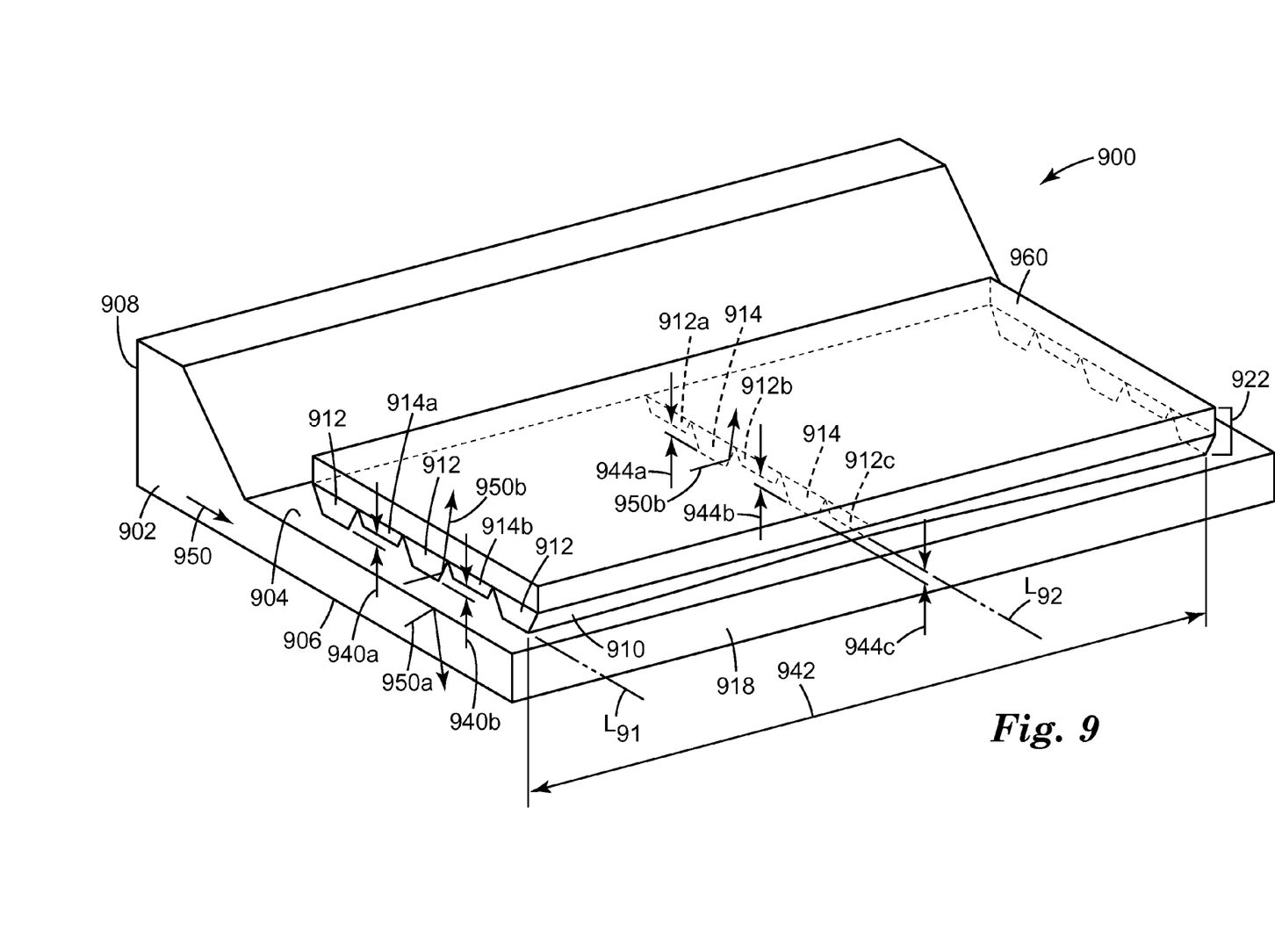
FIG. 9 is a perspective view of a lightguide according to the present description.

In looking at the perspective view of lightguide 900, it is clear that the embodiment illustrates not only a width of the lightguide as was shown in previous figures, such as the distance between a first side surface 908 and an opposing side surface 918, but also a length 942 in the third dimension. As such the optical structures 912 and 914 may be called "linear optical structures" and may be understood as coupling at a given first location along the length of the optical structure (e.g. L91), while potentially not coupling at another given second location along the length of the optical structure. For instance, at location L91, which is at the very front surface of the light extracting layer, first linear optical structures 912 extract light 950b from lightguiding layer 902. In at least some embodiments, however, at location L91, there are certain linear optical structures that do not optically couple to lightguiding layer 902 and thus do not frustrate total internal reflection. This is illustrated by the distance 940a that structure 914a is positioned away from lightguiding layer at location L91, and the distance 940b that structure 914b is positioned away from lightguiding layer at location L91.

In at least some embodiments, the coupling status for a given linear structure will be different at a second location along the length 942 of the optical structure. For example, the first linear optical structures 912 which extract light at first location L91 are illustrated individually at location L92. At second location L92, first linear optical structures 912a, 912b, and 912c each do not frustrate total internal reflection. This may be due, at least in some embodiments, to the structures being spaced away from lightguiding layer's first major surface 904 by distances 944a, 944b, and 944c respectively. Although not required at second location L92, in at least some embodiments, the second linear optical structures 914 may be optically coupled to lightguiding layer at the second location L92 as shown in FIG. 9. Therefore, at location L92, second linear optical structures frustrate total internal reflection and allow for light 950b to be extracted. In this given embodiment, the coupling of the first linear optical structures 912 at first location L1 and lack of coupling at second location L92 is due to the fact that the first linear optical structures 912 are taller at the first location L91 than they are at the second location L92. In this embodiment, second optical structures are taller at location L92, but second optical structures need not be taller at any location along the length 942, and may in fact be shorter.

Figure 10:
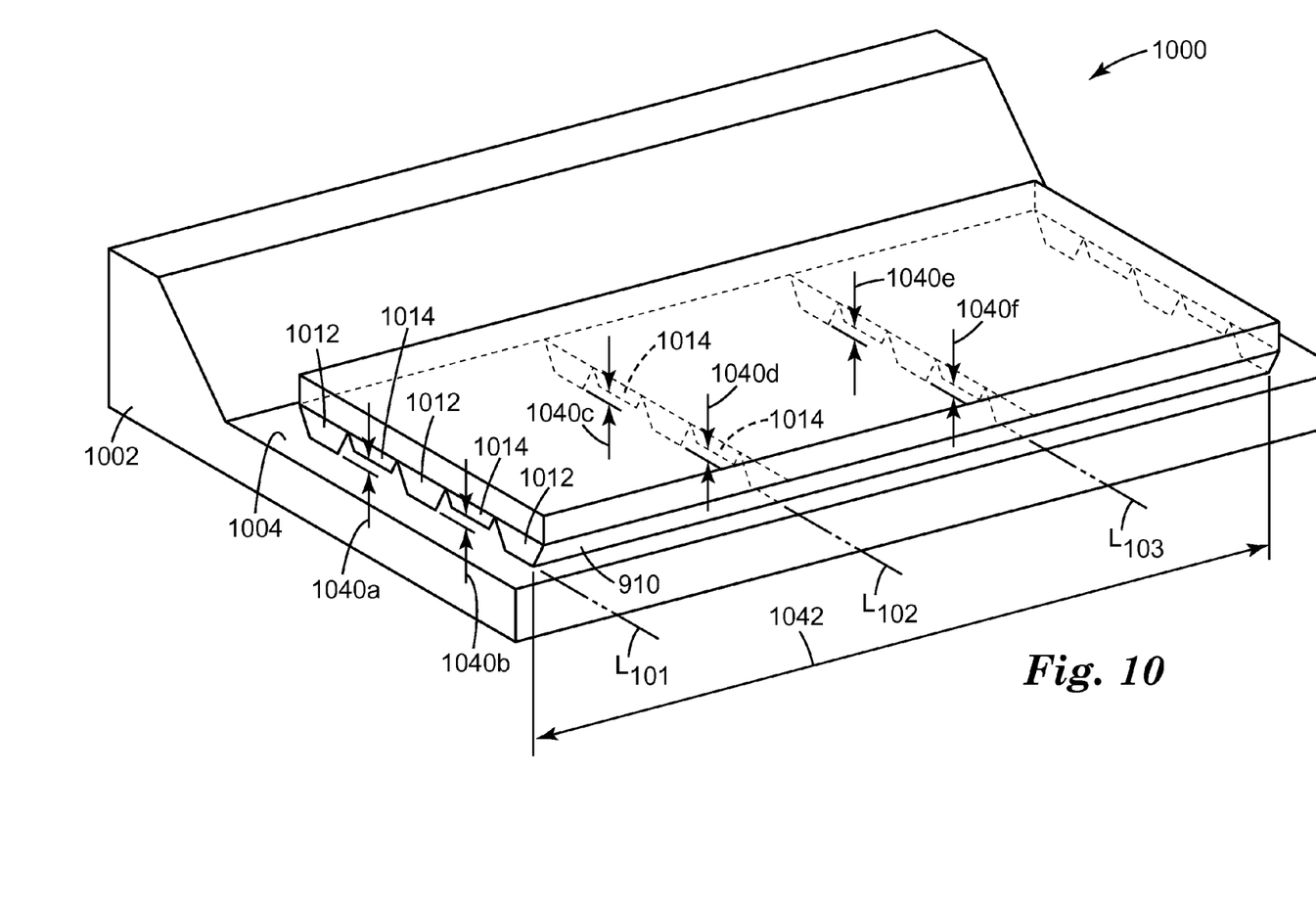
FIG. 10 is a perspective view of a lightguide according to the present description.

In the embodiment shown in FIG. 9, the second linear optical structures 914 do, at some point along the length of the structure, provide for some optical coupling with the first major surface 904 lightguiding layer 902. However, this need not be the case. In some embodiments, as illustrated in FIG. 10 with lightguide 1000, second linear optical structures 1014 will not frustrate total internal reflection at any location along the length of the second linear optical structures. For instance at first location L101 second linear optical structures may be spaced apart by distances 1040a and 1040b to prevent optical coupling. At second location, L102, the second linear optical structures may be spaced apart from the first major surface 1004 of lightguiding layer by distances 1040c and 1040d and at third location, L103 the second linear optical structures 1014 may be spaced from first major surface 1004 by distances 1040e and 1040f. The distances 1040a, b, c, d, e, and f may be different distances or may be approximately equal or equal distances. In any case, at these and all locations along the length of the optical structures 1042, second linear optical structures 1014 will not extract light. In this embodiment, the first linear optical structures 1012 may be optically coupled to first major surface 1004 of lightguiding layer 1002 at one or all of locations L101, L102 and L103. However, each of the three first linear optical structures 1012 may not be optically coupled to the first major surface 1004 at least one location along the length of the structures 1042.

Figure 11:
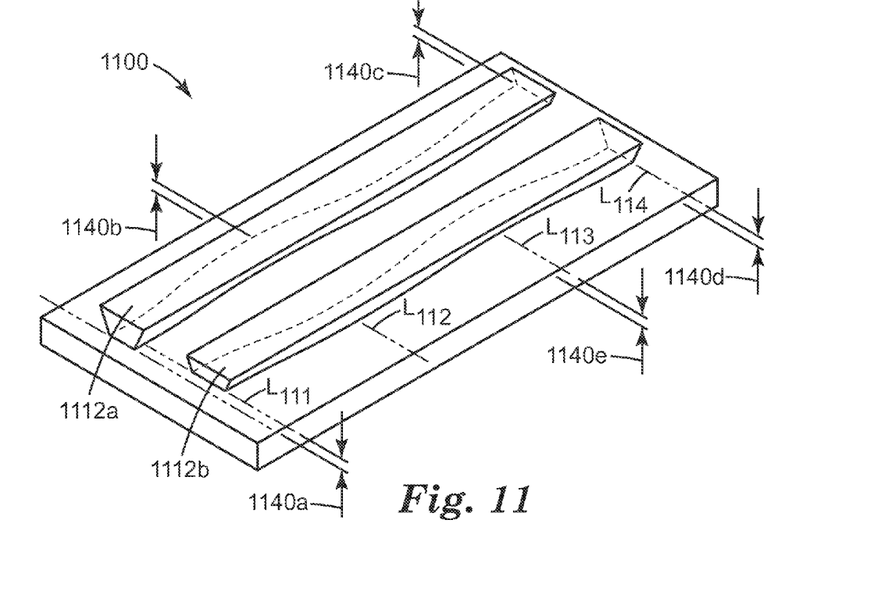
FIG. 11 is a close-up perspective view of a lightguide according to the present description.

Although in FIG. 9, first optical structures share a first location L91 where they are optically coupled to the first major surface 904, this need not be the case. Each of the first linear optical structures may have their own first location where optical coupling occurs, and this first location for one given first linear optical structure need not coincide with the first location of another linear optical structure. A better understanding of this may be gained by the close-up perspective view of a portion of a light extracting film 1100. Here, first linear optical structure 1112a has first location with optical coupling at length L111. However, first linear optical structure 1112b is not optically coupled at length L111. Instead, first linear optical structure 1112b is optically coupled at length L112. Thus, for purposes of this description, first linear optical structure 1112b has a first location of optical coupling at length L112, while first linear optical structure 1112a has a first location of optical coupling at length L111 (or L113). Because first linear optical structure 1112a is spaced apart by distance 1140b and 1140c at locations L112 and L114, respectively, no optical occurs at these locations and thus these locations cannot be considered the first location along the length of the structures. However, at both location L113 and L111, the structure is in contact. Thus, either location may be declared the first location. Structure 112b is spaced apart at location L111, L113 and L114 by distances 1140a, 1140e, and 1140d respectively, and thus only location L112 where optical coupling occurs can be declared the first location for the first linear optical structure.

In FIGS. 9-11, generally the locations where coupling occurs versus does not occur are due to the height of first and second linear optical structures at different locations, as would correspond to the 2-D embodiment illustrated in FIG. 3. However, as with the 2-D embodiments illustrated elsewhere (FIG. 1, 4, 5, 6, etc.), the first and potentially second linear optical structures may be selectively coupled, thereby frustrating total internal reflection by optically coupling to an optical coupling layer. As with the embodiments discussed above, first linear optical structures may be optically coupled to the first major surface at a first location, frustrating total internal reflection, and may not frustrate total internal reflection at second locations. For example, in the close-up view of three linear optical structures in FIG. 12, an optical coupling layer 1250 is shown. As illustrated, optical coupling layer 1250 frustrates total internal reflection at first major surface 1204 by joining first linear optical structures 1212a and 1212c at that given first location L121. First linear optical structure 1212b is not optically coupled at this location However, at location L122 layer 1250 couples structure 1212b to first major surface 1204. This location L122 may therefore be declared the first location for first linear optical structure 1212b. At location L123 structures 1212b and 1212c are optically coupled by layer 1250, while structure 1212a is not coupled to the lightguiding layer 1204 at this location. Therefore, at location L123 structure 1212a does not frustrate total internal reflection at the first major surface 1204. As with the embodiments illustrated in the 2-D perspectives, the optical coupling layer may be any appropriate material. In at least some embodiments, the layer 1250 will be an adhesive, such as a pressure sensitive adhesive, or alternatives discussed further above.

Figure 12:
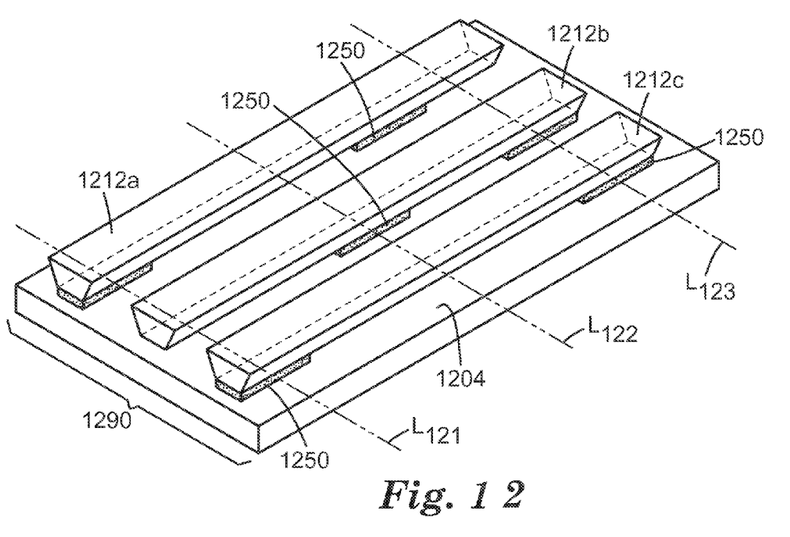
FIG. 12 is a close-up perspective view of a lightguide according to the present description.

It should further be understood that in looking at FIG. 12, one may understand such a figure to correspond to a potential 3-dimensional version of the embodiment shown in FIG. 1. As such, other potential adhesive layers, both continuous and non-continuous are contemplated. For example, the adhesive layer 1250 of FIG. 12 may be continuous across the width 1290 of the lightguiding layer as in FIG. 4, such that structures 1212a, 1212b, and 1212c do not couple at positions where they have a lower height (e.g. in FIG. 11). Elsewhere, coupling layer 1250 may be continuous and of different thicknesses, as shown in 2-dimensions with FIG. 5, such that it bonds with optical structures 1212a, 1212b, and 1212c at length locations and at points along the width of the lightguiding layer where the layer 1250 is thick enough to come into contact and couple with first optical structures. Selective coupling by different refractive indices within a common coupling layer 1250, as shown in FIG. 7 are also contemplated in this 3-dimensional embodiment. The variations may simply occur not only across the width 1290 of the lightguiding layer, as shown in 2 dimensions, but also along the length (see 1042 of FIG. 10) of the optical structures and lightguiding layer.

Figure 8:
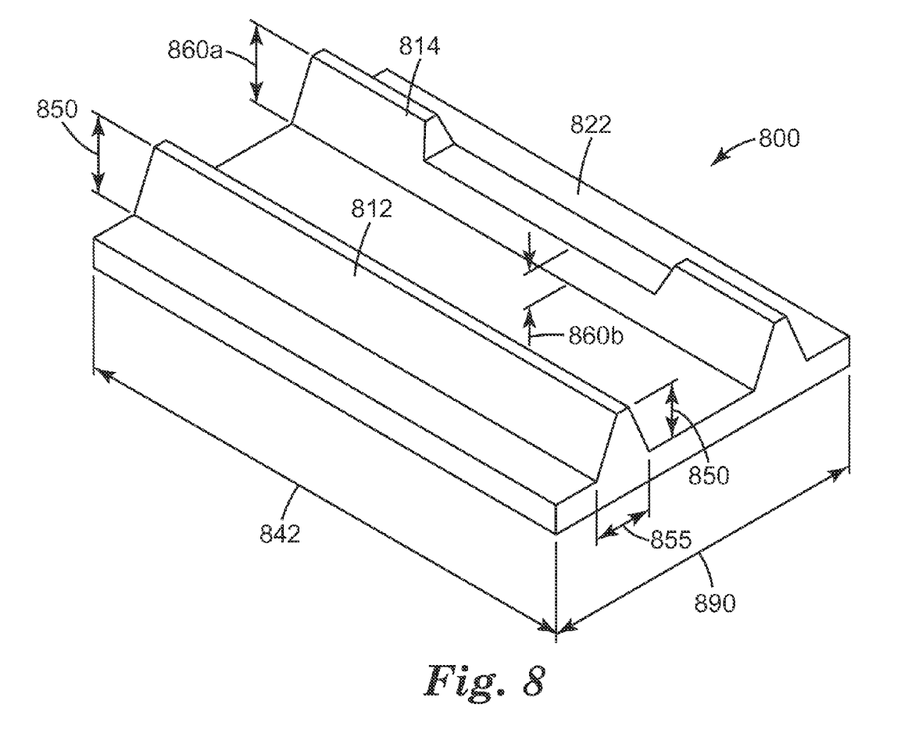
FIG. 8 is a perspective view of a light extracting layer according to the present description

Looking to FIG. 8, it is important to note that where understood in 3-dimensions, the first linear optical structures (e.g. 812) and second linear optical structures (e.g. 814) may be understood as potentially varying in height, but also being continuous along the length of the light extracting layer 842. As such, the length of the structures is far greater than the base width 855 of such structures. For example, the ratio of the length of the structures (along length of film 842) may generally have a ratio over the width of base 855 of at least 10, or at least 50, or at least 100, or at least 500, or at least 1000. In addition, the first and second optical may have a constant height 850, as with first optical structure shown here 812, or may have a varying height such that portions are taller (e.g. height 860a) and shorter (e.g. height 860b). However, the height of such structures will generally not be understood as going to zero along the length of the film 842. Thus, while the layer 822 may have discontinuous discrete structures along the width of the layer 890, the structures will be continuous, although potentially of varying heights greater than zero, along the length 842.

At this point, discussion may, for ease of description, refer to 2-D illustrations showing further embodiments of the current specification. However, it should be understood that for any further discussion and characterization of "first optical structures" and "second optical structures" in 2-D embodiments, the same characterization should be understood to apply as equally effective with respect to "first linear optical structures" and "second linear optical structures."

Figure 13:
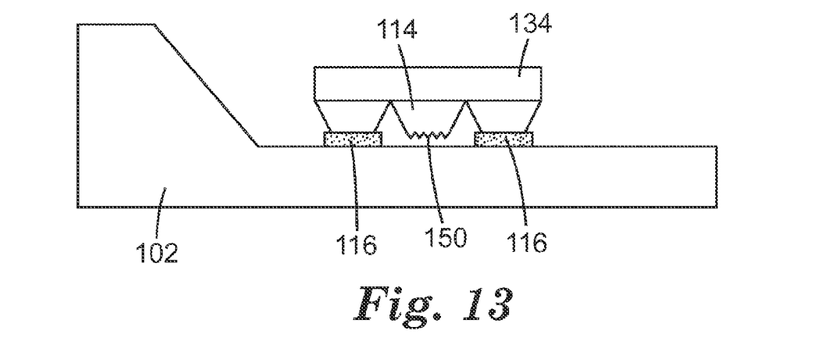
FIG. 13 is a close-up cross-sectional view of a lightguide according to the present description.

Returning to FIG. 1, the tip of the first and second optical structures may have a substantially flat face parallel to the plane of the light extracting layer 122 and/or lightguiding layer 102. In nearly all the figures the first and second optical structures or linear optical structures are illustrated with flat faces parallel to the plane of the film(s). However, in some embodiments, the face may have a fine surface structure. Such an embodiment is illustrated in FIG. 13. Fine surface features 150 may serve the purpose of minimizing optical contact with the lightguiding layer 102 in regions where there is no coupling layer (such as an adhesive 116), i.e. in FIG. 1, below second optical structures 114. Minimizing surface contact and providing directional structure may diffuse any light leaked from the lightguiding layer 102. Methods to create fine surface features 150 include chemical etching or plating of a micro-replication tool, utilization of fine structured diamonds in the original tooling process, post patterning of the tool surface by mechanical means (e.g. sanding), or post processing of the replicated structured surface by laser ablation or mechanical means.

It is important to note that the first and second optical structures need not have a flat surface to contact the adhesive that creates optical contact with the lightguiding layer (where an adhesive is used). Rather, the tips of the structures may be pointed, truncated, or roughened, and these tips will be substantially index matched by the adhesive, effectively truncating them from an optical viewpoint. Any index mismatch between the structures and the adhesive (where used) can be used to mitigate the angle and spatial distribution of the light advantageously.

Although the present description provides for a lightguide in which a number of supplementary optical components generally used for backlighting may not be necessary, the lightguide may also be used in conjunction with other optical elements. For example, light may be optically diffused following extraction by the light extracting layer. Methods to combine a diffuser with a light extracting layer (e.g. layer 122 or 922) include using replicated surface structure on the top surface of the light extracting layer (opposite the structured surface—see, e.g., 160 or 960), using diffusive particles within the light extracting layer, or potentially applying a diffusive coating on the top surface of the light extracting layer. Alternatively, a substrate for the light extracting layer can be diffusive.

Figure 14:
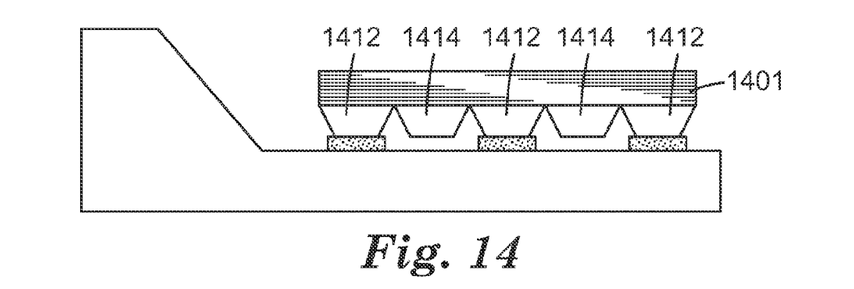
FIG. 14 is a cross-sectional view of a lightguide according to the present description.
Figure 15:
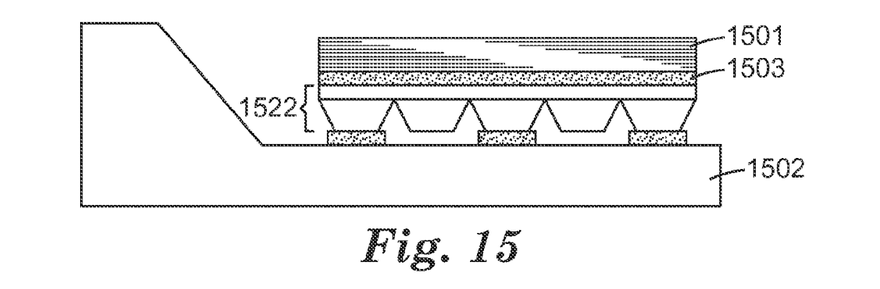
FIG. 15 is a cross-sectional view of a lightguide according to the present description.

FIG. 14 illustrates another contemplated embodiment of the present description. A reflective polarizer may be incorporated with the light extracting layer by microreplicating the first and second optical structures 1412 and 1414 directly on to reflective polarizer films. The reflective polarizer 1401 serves to increase backlight brightness by recycling polarized light. A reflective polarizer for use with the light extracting layers currently described may be multi-layer, wire grid, or cholesteric type. Examples of suitable reflective polarizers include 3M Dual Brightness Enhancing Film, cholesteric, and wire grid films or plates. Another example is Collimating Multilayer Optical Film or CMOR, which has both polarization and angle recycling capabilities. Looking to FIG. 15, a diffuser function may also be incorporated into the adhesive 1503 that joins the light extraction structures and the reflective polarizer. The combination of a lightguiding layer 1502, an extracting layer 1522, a diffusive adhesive 1503 and a reflective polarizer 1501 allows for an extremely thin and efficient unitary backlight construction.

Figure 16:
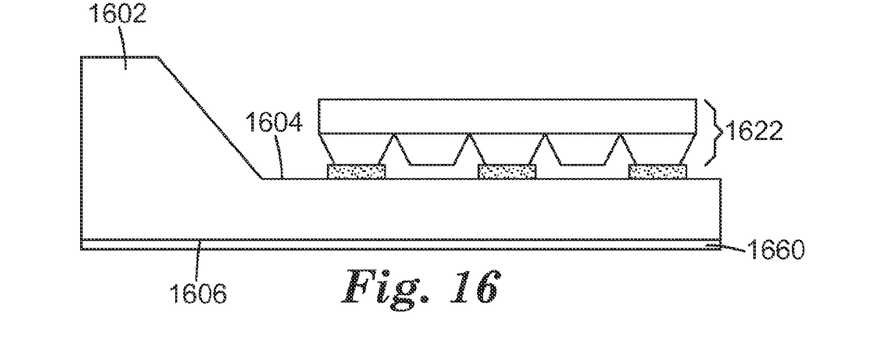
FIG. 16 is a cross-sectional view of a lightguide according to the present description.

Another potential contemplated element to be used in conjunction with the lightguides described herein is illustrated in FIG. 16. A reflector 1660 may be incorporated into a unitary backlight construction with lightguiding layer 1602 by adhering it to the second major surface 1606 (or lower surface) of lightguiding layer 1602 opposite first major surface 1604 (and light extracting layer 1622). Methods of adhesion include lamination by a spatially uniform adhesive, lamination using a patterned adhesive or low surface area adhesive, such as a microsphere adhesive. It may be advantageous to use adhesive with an effective refractive index (refractive index of adhesive+that of air) which is lower than that of the lightguiding layer in order to facilitate light guiding. Generally, the first optical structures' distribution will depend on this effective index to maximize backlight efficiency and uniformity.

Figure 17:
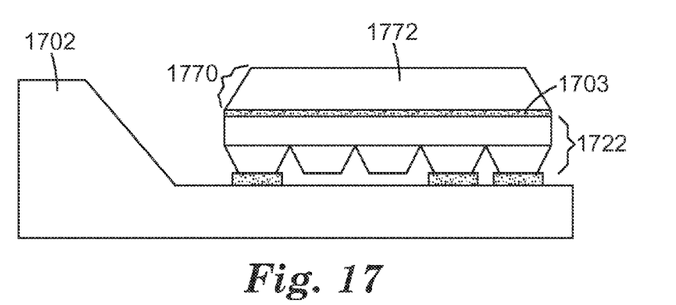
FIG. 17 is a cross-sectional view of a lightguide according to the present description.

Another potential component that may be used in conjunction with the lightguides of the present description, or as part of the lightguides of the present description, is an angle management film 1770. As illustrated in FIG. 17 an angle management film may be adhered to the top of the extracting layer or film 1722, in order to better redirect light along the width of the lightguide and lightguiding layer 1702. One example of a suitable angle management film 1770 would be a brightness enhancing film, such as BEF from 3M Company, whose prisms run along the length of the 3-D lightguide (e.g. 942 of FIG. 9). Another suitable angle management film would be a layer of microbeads or other suitable prismatic structure. The reflective polarizer 1401 or 1501 provided in FIGS. 14 and 15 could be placed between the extracting layer 1722 and the angle management film 1770, can be adhered to the top of the angle management film (1772), or may be separate from the construction. In the case of linear prismatic structures, an extended tip may be used for enhancement of adhesion to a top film, with minimal impact on the air space needed to achieve best performance. A diffusive element such as the potential embodiment provided above (e.g. a diffusive coating, diffusive adhesive, diffusive particles in light extracting layer 122, etc.) may also be included in the embodiment of FIG. 17 to improve spatial uniformity. Preferably the diffusive element will be included on the opposite side of the reflective polarizing element from the image display. For example, a diffuse adhesive 1703, such as diffuse adhesive 1503 in FIG. 15, may be used to laminate the light extracting layer 1722 to a reflective polarizer, or a reflective polarizer to angle management film 1770, or an extracting layer 1722 to management film 1770 (as illustrated in FIG. 17).

In a case where a reflective polarizer is placed between a light extracting layer (e.g. 1722 of FIG. 17) and an angle management film (e.g. 1770 of FIG. 17), the reflective polarizer's pass axis may be placed at an arbitrary orientation to the extractor and angle management film axes. For example, a reflective polarizer may be laminated to the top of the extractor layer at a desired orientation followed by lamination of the angle management film at an angle crossed (90 degrees) to that of the extraction film. Another method of manufacturing the combination of extractor layer, reflective polarizer and angle management film is to use rotated tooling for both the extractor layer and angle management film, and replicate these features onto respective sides of the reflective polarizer, either in a sequential or parallel replication process.

The unitary backlight component described above (and one or all of the additional components discussed) may also be attached to the lower absorptive polarizer of an LCD panel. An advantage of this construction is to provide structural integrity to the backlight elements, and to simplify system design. The attachment adhesive for the elements may again be used to diffuse light and improve backlight illumination uniformity.

The spatial uniformity of the backlight system consisting of a lightguiding layer and a light extracting layer may be adjusted by suitable patterning of the extracting layer structure distribution, the coupling medium, or a combination of the two, as described herein. In addition, the lightguiding layer may be modified by applying an extractor or diffusive layer on the second major surface (e.g. surface 106 of FIG. 1) to fine tune the degree of uniformity afforded by the lightguiding layer (102) and its associated coupling.

To maintain uniformity of the light outputted from the display, it also may be desirable to have light extracting optical structures that are further away from the light source be greater in size, and more closely positioned. Light extracting optical structures that are closer to the light source may generally be smaller in dimension and potentially spaced further apart.

The present invention should not be considered limited to the particular examples and embodiment described above, as such embodiments are described in detail above to facilitate explanation of various aspects of the invention. Rather, the present invention should be understood to cover all aspects of the invention, including various modifications, equivalent processes, and alternative devices falling within the spirit and scope of the invention as defined by the appended claims.

What is claimed is:

1. A lightguide comprising:
a lightguiding layer comprising a first major surface, an opposing second major surface, and a side surface, the lightguiding layer receiving light from the side surface, the received light propagating within the lightguiding layer by total internal reflection from at least the first major surface;
a structured surface facing the first major surface of the lightguiding layer and comprising:
a first plurality of first optical structures, each first optical structure extracting light from the lightguiding layer by frustrating total internal reflection at the first major surface of the lightguiding layer;
a second plurality of second optical structures, each second optical structure not frustrating total internal reflection at the first major surface of the lightguiding layer; and
an optical coupling layer, each first optical structure frustrating total internal reflection at the first major surface by being optically coupled to the lightguiding layer by the optical coupling layer, each second optical structure not frustrating total internal reflection at the first major surface by not being optically coupled to the lightguiding layer by the optical coupling layer.

2. The lightguide of claim 1, wherein each first optical structure is taller than each second optical structure.

3. The lightguide of claim 1, wherein the optical coupling layer optically couples each first optical structure to the lightguiding layer by adhering the first optical structure to the first major surface, and wherein the optical coupling layer does not optically couple each second optical structure to the lightguiding layer by not adhering the second optical structure to the first major surface.

4. The lightguide of claim 1, wherein the optical coupling layer is discontinuous.

5. The lightguide of claim 1, wherein the optical coupling layer is continuous.

6. The lightguide of claim 1, wherein the optical coupling layer is an adhesive.

7. The lightguide of claim 1, wherein the optical coupling layer is a pressure sensitive adhesive.

8. The lightguide of claim 1, wherein the optical coupling layer covers the first major surface in each area corresponding to a first optical structure and the optical coupling layer does not cover the first major surface in each area corresponding to a second optical structure.

9. The lightguide of claim 1, wherein the optical coupling layer is thicker in each area corresponding to a first optical structure and the optical coupling layer is thinner in each area corresponding to a second optical structure.

10. The lightguide of claim 1, wherein the optical coupling layer has a first higher index in each area corresponding to a first optical structure and the optical coupling layer has a second lower index in each area corresponding to a second optical structure.

11. The lightguide of claim 10, wherein the first higher index is greater than about 1.4 and the second lower index is less than about 1.3.

* * * * *